United States Patent [19]

Holt

[11] 4,327,383

[45] Apr. 27, 1982

[54] READ CIRCUIT FOR A FLOPPY DISK DRIVE

[75] Inventor: Dewilton R. Holt, El Toro, Calif.

[73] Assignee: Siemens Corporation, Iselin, N.J.

[21] Appl. No.: 190,972

[22] Filed: Sep. 26, 1980

[51] Int. Cl.³ .............................................. G11B 5/09
[52] U.S. Cl. ........................................ 360/45; 360/43
[58] Field of Search ......................... 360/43, 45, 65; 364/724, 825

[56] References Cited

U.S. PATENT DOCUMENTS

| | | | |
|---|---|---|---|
| 4,081,756 | 3/1978 | Price et al. | 360/45 |
| 4,244,008 | 1/1981 | Holt | 360/45 |
| 4,264,935 | 4/1981 | Ice | 360/45 |
| 4,276,573 | 6/1981 | Halpern et al. | 360/45 |

OTHER PUBLICATIONS

Schneider, Richard C., "An Improved Pulse-Slimming Method for Magnetic Recording", Sep. 1975, pp. 1240, 1241.
Schlaepfer, C. E., "Signal-Processing for Increased Bit Densities in Digital Magnetic Recording", pp. 2–10.
Melbye, Hartvig E., "Determination of Frequency-Dependent Magnetic Recording Losses", Nov. 1976, pp. 737–739.
Talke, F. E., Tseng, R. C., "Effect of Submicrometer Transducer Spacing on the Readback Signal in Saturation Recording", Nov. 1975, pp. 591–596.
Van Herk, A., "Analytical Expressions for Side Fringing Response and Crosstalk with Finite Head and Track Widths", Nov. 1977, pp. 1764–1766.
Speliotis, D. E., Chi, C. S., "The Remanent Magnetization in Particulare Disk Coating", Nov. 1976, pp. 734–736.
Horiguchi, T., Morita, K., "An Optimization of Modulation Codes in Digital Recording", Nov. 1976, pp. 740–742.
Wildmann, M., "Mechanical Limitations in Magnetic Recording", Apr. 1, 1974, pp. 509–514.
Davidson; Martin, Haase, Stephen F., Machamer, James L., Wallman, Lawrence H., "High Density Magnetic Recording Using Digital Block Codes of Low Disparity", Sep. 1979, pp. 584–586.
Speliotis, D. E., Chi, C. S., "The Effect of Thickness in High Bit Density Recording on Particulate and Plated Disks", Sep. 1977, pp. 1287–1289.
Talke, F. E., Tseng, R. C., "An Experimental Investigation of the Effect of Medium Thickness and Transducer Spacing on the Read-Back Signal in Magnetic Recording Systems", Jun. 1973, pp. 133–138.
Pottary, Robert I., "Digital Magnetic Recording Theory", Apr. 22, 1974, pp. 502–508.
Mallinson, J. C., "On Recording Head Filed Theory", Apr. 1974, pp. 733–775.
Jacoby, George V., "A New Look-Ahead Code for Increased Data Density", Sep. 1977, pp. 1202–1204.
Tachibana, Makoto, Ohara, Masanobu, "Optimum Waveform Design and Its Effect on the Peak Shift Compensation", Sep. 1977, pp. 1199–1201.
Geffon, Arthur P., "A 6K BPI Disk Storage System Using MOD-11 Interface", pp. 1205–1207, Sep. 1977.
Kameyama, T., Takanami, S., Arai, R. "Improvement of Recording Density by Means of Cosine Equalizer, Nov. 1976, pp. 746–748.
Tahara, Y., Takagi, H. Ikeda, Y., "Optimum Design of Channel Filters for Digital Magnetic Recording", Nov. 1976, pp. 749–750.
Haynes, M. K., "Experimental Determination of the Loss and Phase Transfer Functions of a Magnetic Recording Channel, Sep. 19, pp. 1284 & 1285.

*Primary Examiner*—Vincent P. Canney
*Attorney, Agent, or Firm*—Spellman, Joel and Pelton

[57] ABSTRACT

A read circuit for a floppy disk drive is disclosed. The circuit comprises a read head for generating an electrical signal corresponding to recorded data, plus an amplifier, equalizing filter, low pass filter and decoder for processing the electrical signal. The equalizing filter has a response, in the frequency domain, determined by the Laplace transform:

$$F(s) = \frac{1 - T_1 T_2 s^2}{T_2 s + 1}.$$

34 Claims, 7 Drawing Figures

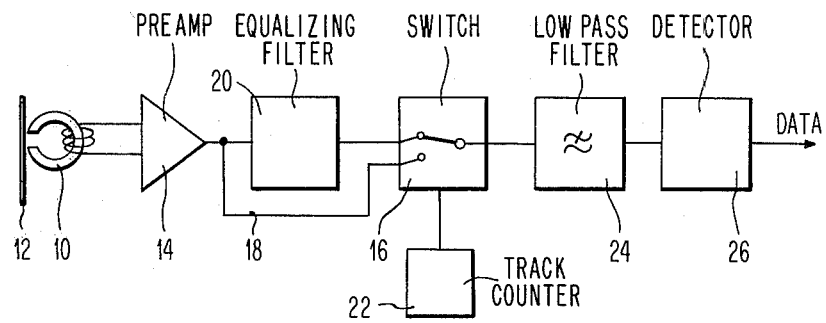
FIG. 1
FIG. 2
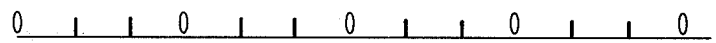
FIG. 3
FIG. 4
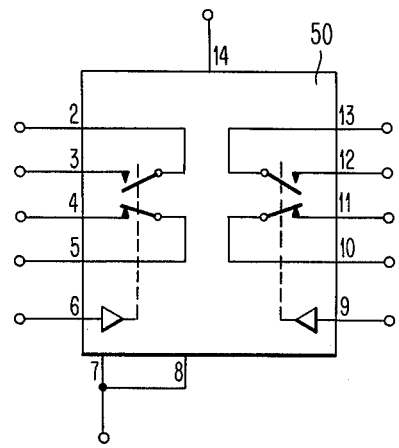
FIG. 6

READ CIRCUIT FOR A FLOPPY DISK DRIVE

BACKGROUND OF THE INVENTION

The present invention relates to apparatus for reading digital data recorded on a record medium such as a floppy disk, hard magnetic disk, magnetic tape or the like. The invention is specifically and advantageously designed for use in a read circuit for a floppy disk drive.

Apparatus for reading pre-recorded digital data from a record medium, such as a floppy disk, normally comprises a read transducer, such as a magnetic head, for generating an electrical signal corresponding to the recorded data; an amplifier for amplifying this electrical signal; suitable filters for modifying the electrical signal; and a decoder for generating a data stream from the filtered signal. In circuits of this kind, two types of filters are sometimes used: (1) a so-called "equalizing filter" for enhancing the recording signal to compensate for the finite, real world constraints in writing and reading from recorded media and (2) a so-called "Gaussian filter" for removing white noise and other high frequency noise components from the recording signal.

Much attention has been directed to the development of equalizing filters for reading recorded data from magnetic media. R. C. Schneider describes "An Improved Pulse-Slimming Method For Magnetic Recording" in IEEE Transactions on Magnetics, Vol. MAG-11, No. 5, Sept. 1975. This article discloses a basic pulse-slimming building block that enables the leading and trailing edge of an isolated read pulse to be slimmed independently. The first stage of this building block (shown in FIG. 1) slims the trailing edge of the pulse by adding a portion of the first derivative. The second stage slims the leading edge of the pulse by subtracting a portion of the first derivative. This building block, combined with an integrator to convert peaks the zero-crossings, equalizes the phase and amplitude of the recording channel. The frequency response of this circuit is shown in FIG. 8.

C. E. Schlaepfer discloses linear waveform filters in "Signal Processing For Increased Bit Densities In Digital Magnetic Recording", published by I.B.M. Corp., San Jose, Calif. In this paper, Schlaepfer discusses the problem of degeneration of readback signals caused by interaction of adjacent pulses. As shown in FIG. 2 of the paper, increasing the data packing density beyond the condition where the bit period is less than half the pulse basewidth results in detrimental interaction between adjacent pulses. For two adjacent "1's" surrounded by "0's" the familiar peak-shift phenomenon occurs. This peak-shift may be viewed as a linear superposition of individual basic pulses so that the analysis of the readback signal is simplified to the treatment of a single representative pulse.

In order to permit higher data packing densities without pulse interaction, Schlaepfer provides an example of a pulse-slimming filter (FIG. 7). Like the "building block" of Schneider, this filter amplifies the higher frequency components of the read signal. This is accomplished while fulfilling the requirement that the filter have a linear time delay; that is, that it provide the same phase delay at all frequencies. However, this filter has two main disadvantages: (1) it has a 12 dB/octave gain rise which is too much of an increase in amplitude at the higher frequency components, and (2) it uses a passive network which creates a lower frequency pole, resulting in the necessity of adding a differentiator to cancel this pole.

SUMMARY OF THE INVENTION

It is a principle object of the present invention to provide a circuit for reading digital data recorded on a record medium which permits more information to be stored on a surface of the medium than was previously possible.

It is another object of the present invention to provide an equalizing filter for a read circuit which has a linear time delay and which overcomes the disadvantages referred to above for the previously known filters.

It is still another object of the present invention to utilize operational amplifiers to implement an equalizing filter.

These objects, as well as other objects which will become apparent from the discussion that follows, are achieved, according to the present invention, by providing an equalizing filter for a read circuit having a response, in the frequency domain, determined by the Laplace transform:

$$F(s) = \frac{1 - T_1 T_2 s^2}{T_2 s + 1}, \text{ where}$$

s is the complex frequency $\sigma + j\omega$, $T_1$ is a time constant which creates a high frequency pole on the complex s plane, and $T_2$ is a time constant which creates a low frequency zero on the complex s plane.

This equalizing filter provides a substantially linear time delay and a gain rise in the range of 4–8 dB per octave (about 6 dB) for frequencies in the region of the fundamental and second harmonic of an electrical signal representing the data bit string 110110 . . . This data bit string provides the "worst case" signal in that it creates the maximum peak shift resulting from pulse interaction. In a preferred embodiment of the present invention, the read circuit is employed for a magnetic record and, in particular, a floppy disk. The read transducer for generating and electrical signal corresponding to the recorded data is a magnetic read head and the apparatus includes an additional low-pass, Gaussian filter, following the equalizing filter, for eliminating high frequency components such as white noise.

According to a preferred feature of the read circuit according to the present invention, a switch is provided to by-pass the equalizing filter when reading tracks with a low data packing density; for example, when reading the outer-most tracks on a floppy disk. This is desirable because the equalizing filter would overcompensate the recording signal with too much gain. In the case of a floppy disk, the by-pass switch is controlled by a track counter which determines the track location of the magnetic head.

The preferred implementation of the equalizing filter includes an operational amplifier having a positive and a negative input and output; a first resistor coupling the input of the equalizing filter with the positive input of the operational amplifier; a first capacitor coupling the ground of the equalizing filter with the positive input of the operational amplifier; a second capacitor coupling the input of the equalizing filter with the negative input of the operational amplifier and a second resistor coupling the output of the operational amplifier with the negative input thereof. This circuit operates, in the frequency domain, to effect the Laplace transform set forth above.

In this preferred embodiment, the operational amplifer preferably includes a stabilizing resistor, connected in series with the second capacitor, and a stabilizing capacitor connected between two additional inputs, one of which serves to receive the DC voltage supply. A further stabilizing capacitor is preferably connected in parallel with the second resistor.

According to still another preferred feature of the present invention, the amplifier for the recording signal is a differential amplifier having a differential input and a differential output. The equalizing filter is then formed by two identical filter devices, each connected to one terminal of the differential output. Preferably, the filter devices have a common, floating ground.

For a full understanding of the present invention, reference should now be made to the following detailed description of the preferred embodiment and to the accompanying drawings.

BRIEF DESCRIPTION OF THE DRAWINGS

FIG. 1 is a block diagram of a floppy disk read circuit according to a preferred embodiment of the present invention.

FIG. 2 is a first timing diagram illustrating the operation of the read circuit shown in FIG. 1.

FIG. 3 is a second timing diagram illustrating the operation of the read circuit shown in FIG. 1.

FIG. 4 is a third timing diagram illustrating the operation of the read circuit shown in FIG. 1.

FIG. 6 is an equivalent circuit diagram illustrating the operation of the by-pass switch shown in FIG. 5.

DESCRIPTION OF THE PREFERRED EMBODIMENTS

Figure 5:
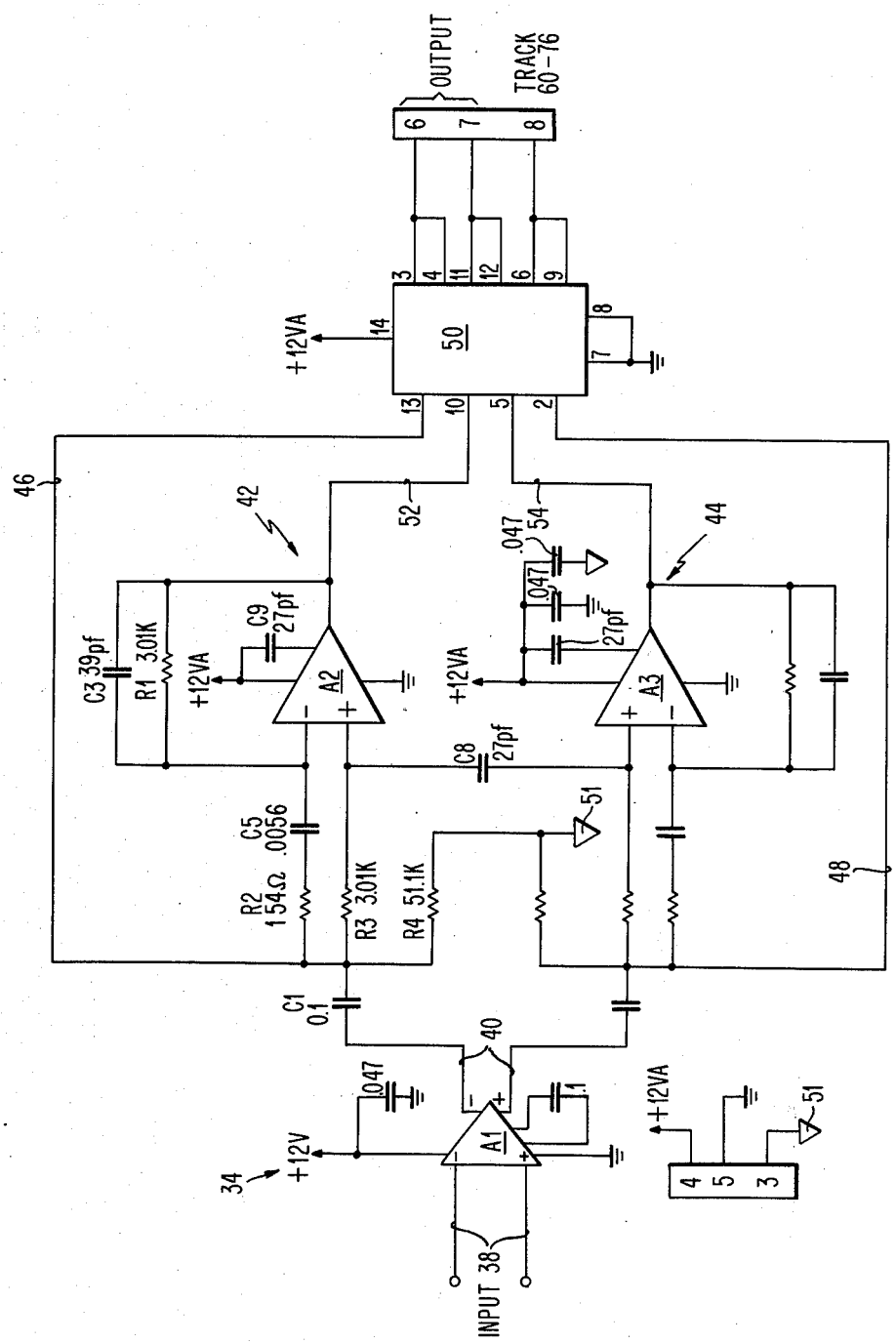
FIG. 5 is a schematic diagram of the equalizing filter and by-pass switch in the read circuit in FIG. 1.

The preferred embodiments of the present invention will now be described with reference to FIGS. 1-7 of the drawings. Identical elements shown in the various figures are designated with the same reference numerals.

FIG. 1 shows the general structure of a floppy disk drive read circuit according to a preferred embodiment of the present invention. This circuit employs a transducer or magnetic head 10 arranged in operative relationship with a floppy disk 12. A magnetic recording signal generated by the head 10 is amplified by a preamplifier 14 and passed to a switch 16 both directly, via a line 18, and indirectly via an equalizing filter 20. The switch 16 selects either the filtered or unfiltered signal in dependence upon the track position of the head 10 supplied from a track counter 22. In the outer tracks of the floppy disk, where the linear tracking speed is greater, the switch 16 is operated to pass the signal received directly from the preamplifier 14. For the inner tracks of the floppy disk for which the magnetic head tracking speed is slower, the switch 16 is operated to pass the electrical signal received from the equalizing filter 20. Thus the gain introduced by the equalizing filter will be used only when it is needed to compensate for pulse crowding.

The magnetic recording signal, as selected by the switch 16, is supplied to a low-pass filter 24 which eliminates high-frequency noise. The amplified and filtered signal is then passed to a defector 26 which extracts the serial digital data stream. The detector 26 includes a differentiation stage, followed by a comparator which digitizes the analog signal. The signal may be conditioned by passing it through a one shot multivibrator.

FIG. 3 illustrates ideal magnetic recording pulses produced in the magnetic head 10 which represents the digital data of FIG. 2, for example, when modified frequency modulating (MFM) recording is used. As may be seen, each digital "1" is represented by a pulse 30, whereas each digital "0" is represented by the absence of a pulse. Clock synchronization is maintained with two or more adjacent "0's" by inserting a synchronization pulse 28 midway between the instants of time that the "0's" or "1's" are expected.

FIG. 4 shows a clock signal which may be generated by a clock generator from the data and synchronization pulses. This clock signal can be viewed as providing individual time "windows" by pulses 32 for separating the synchronization pulses 31 from the data pulses 30. The synchronization pulses 31 fall between the windows and are not decoded as data pulses. Normally this data separation or decoding is effected by a phase lock circuit which is separated from the read circuit described herein.

A consideration of FIGS. 2, 3 and 4 illustrate the importance of maintaining the relative time positions of the data pulses 30. Any peak shift in these pulses may have the result that they fall outside the respective time windows and are not decoded. The present invention is directed to eliminating, or at least reducing this peak shift so that binary digital data in any serial data configuration can be decoded. FIG. 5 shows the preferred embodiment of a circuit according to the invention containing a preamplifier, an equalizing filter and a by-pass switch. The preamplifier stage includes a differential amplifier A1 with a differential input 38 and differential output 40. This output 40 is supplied via blocking capacitors C1 and C2 to identical equalizing filters 42 and 44 as well as to lines 46 and 48. The lines 46 and 48 as well as the output lines 52 and 54 of the filters 42 and 44, respectively, are all connected to a switch 50. The switch 50 consists of four field-effect transistors connected to operate as two double-pole, single throw switches as indicated schematically in FIG. 6. Such a switch 50 may be constructed of discrete components, but it is also available as an integrated circuit under the number DG303.

As shown in FIGS. 5 and 6, the switch 50 either connects the input terminals 10 and 5, which receive signals from the filters 42 and 44, respectively, to the output terminals 11 and 4, or connects the input terminals 13 and 2, which receive signals via lines 46 and 48, respectively, to the output terminals 12 and 3. The output terminals 3, 4 and 11, 12 are connected together and provide output signals at circuit board terminals 6 and 7, respectively.

A circuit board terminal 8 is connected to a track counter 22 and receives a "1" signal when the floppy disk drive is addressed to read data from one of tracks. This signal is applied to pins 6 and 9 of the switch 50 to throw the switch to the opposite state. With the "1" signal present, the switch connects the filters 42 and 44 with the output terminals 6 and 7.

The filter circuits 42 and 44 each comprise an operational amplifier A2 and A3, respectively, and are connected to a common, floating ground 51. The amplifiers may be of the type commercially available under the number 2627. Since the circuits 42 and 44 are identical, only one circuit 42 will be described. Under certain circumstances, in fact, only one such circuit is needed.

The operational amplifier A2 and its surrounding, associated components integrate the incoming signal, differentiate it and then subtract the differentiated signal from the integrated signal. In particular, the integrator is formed by the components R3 and C8; the differentiator is formed by the components R1 and C5.

In the frequency domain, the filter circuit 42 operates according to the Laplace transform:

$$F(s) = \frac{1 - T_1 T_2 s^2}{T_2 s + 1},$$

where s is the complex frequency $\sigma + j\omega$, $T_1$ is a time constant (the product of R3 and C8) which creates a high frequency pole on the complex s plane, and $T_2$ is a time constant (the product of R1 and C5) which creates a low frequency zero on the complex s plane.

The amplifier A2 subtracts the zero from the pole to generate a polynomial of the form $1 - T_1 T_2 s^2$. This polynomial creates a linear time delay function with a gain rise of 12 dB/octave. According to the invention, an additional pole is provided in the Laplace transform, $T_2 s + 1$, to control how fast the gain goes up. The circuit design forces this pole to be high in frequency, thereby eliminating the need for an addtional differentiator.

The resistor R2 is used to help stabilize the equalizing circuit. The capacitor C1 is used to block the DC voltage from the amplifier A1. The resistor R4 provides the DC voltage bias for the amplifier A2. Capacitors C3 and C9 are used to stabilize the amplifier A2.

As mentioned above, the equalizing circuits 42 and 44 are identical. Both circuits 42 and 44 are used because of the differential output on lines 40 from the amplifier A1, but two circuits are not always required.

Figure 7:
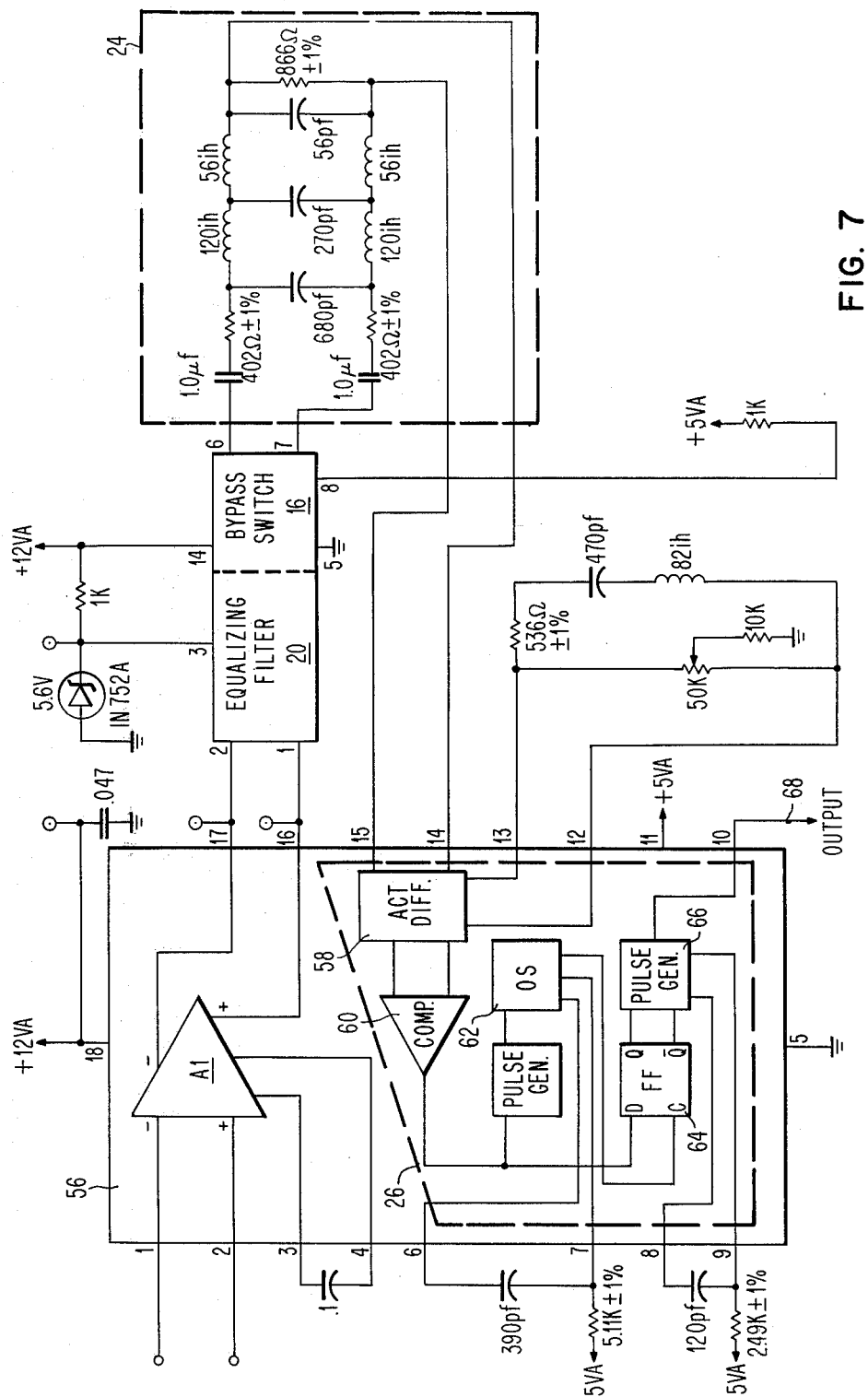
FIG. 7 is a schematic diagram of the read circuit shown in FIG. 1.

FIG. 7 shows in detail the read circuit illustrated in FIG. 1. The equalizing filter 20 and by-pass switch 16, indicated in block form in FIG. 7, comprise the filters 42 and 44, as well as the switch 50 shown in FIG. 5.

The circuit of FIG. 7 comprises an integrated circuit 56 which contains the preamplifier A1 as well as the detector 26; however, it may, of course, be constructed of discrete components. The integrated circuit is commercially available under the number MC3470.

The circuit of FIG. 7 also comprises a Gaussian filter 24 connected to the output of the equalizing filter 20 and switch 16. The Gaussian filter preferably has a frequency cut-off at approximately 600 Hz. This low pass filter eliminates white noise and, as with the equalizing filter, it provides a linear time delay.

The output of the filter 24 is supplied to a detecting stage 26 comprising a differentiator 58, a comparator 60, and a one-shot multivibrator 62. The output of the one-shot is passed to a flip flop 64 and then to a pulse generator 66 which produces the circuit output on line 68.

There has thus been shown and described a novel circuit for reading digital data from a record medium which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are intended to be covered by the invention which is limited only by the claims which follow.

What is claimed is:

1. In apparatus for reading digital data recorded on a record medium, said apparatus comprising a read transducer for generating an electrical signal corresponding to the recorded data, amplifier means for amplifying said electrical signal, and equalizing filter means for modifying said electrical signal, the improvement wherein said equalizing filter means has a response, in the frequency domain, determined by the Laplace transform:

$$F(s) = \frac{1 - T_1 T_2 s^2}{T_2 s + 1}, \text{ where}$$

s is the complex frequency $\sigma + j\omega$, $T_1$ is a time constant which creates a high frequency pole on the complex s plane, and $T_2$ is a time constant which creates a low frequency zero on the complex s plane.

2. The apparatus recited in claim 1, wherein said record medium is magnetic record and said transducer is a magnetic head.

3. The apparatus recited in claim 2, wherein said record medium is a floppy disk.

4. The apparatus recited in claim 1, wherein $T_1$ and $T_2$ are symmetrical about a point of interest.

5. The apparatus recited in claim 1, wherein the low frequency zero is at a frequency below the fundamental of the said electrical signal, when said electrical signal represents the data bit string 110110.

6. The apparatus recited in claim 5, wherein the high frequency pole is at a frequency above the second harmonic of said electrical signal.

7. The apparatus recited in claim 1, further comprising low-pass Guassian filter means for modifying said electrical signal.

8. The apparatus recited in claim 1, further comprising by-pass switch means for selectively disconnecting said equalizing filter means from the signal path when the signal modification is not desired.

9. The apparatus recited in claim 8, wherein said record medium is a constant speed rotating disk having tracks at different radii, and wherein said switch means includes track counter means for disconnecting said equalizing filter means when reading tracks having at least a predetermined radius.

10. The apparatus recited in claim 1, wherein said amplifier means is a differential amplifier having a differential input and a differential output.

11. The apparatus recited in claim 10, wherein said equalizing filter means comprises two identical filter devices, each connected to one terminal of said differential output.

12. The apparatus recited in claim 11, wherein said filter devices have a common, floating ground.

13. The apparatus recited in claim 1, wherein said equalizing filter means provides a substantially linear time delay and a gain rise in the range of 4-8 dB per octave for frequencies in the region of the fundamental and second harmonic of an electrical signal representing the data bit string 110110.

14. The apparatus recited in claim 13, wherein said gain rise is substantially equal to 6 dB.

15. The apparatus recited in claim 1, wherein said equalizing filter means comprises, in combination:
 (a) an operational amplifier having a positive and a negative input and an output;
 (b) a first resistor coupling the input of said equalizing filter means with said positive input of said operational amplifier;
 (c) a first capacitor coupling the ground of said equalizing filter means with said positive input of said operational amplifier;
 (d) a second capacitor coupling said input of said equalizing filter means with said negative input of said operational amplifier; and
 (e) a second resistor coupling said output of said operational amplifier with said negative input thereof.

16. The apparatus recited in claim 15, wherein said equalizing filter means further comprises a stabilizing capacitor connected in parallel with said second resistor.

17. The apparatus recited in claim 15, wherein said operational amplifier includes two additional inputs, one of said additional inputs being connected to a DC voltage source, and wherein said equalizing filter further comprises a stabilizing capacitor connected between two additional inputs.

18. The apparatus recited in claim 15, wherein said equalizing filter means further comprises a stabilizing resistor connected in series with said second capacitor.

19. In apparatus for reading digital data recorded on a record medium, said apparatus comprising a read transducer for generating an electrical signal corresponding to the recorded data, amplifier means for amplifying said electrical signal, and equalizing filter means for modifying said electrical signal, the improvement wherein said equalizing filter means provides a substantially linear time delay and a gain rise in the range of 4–8 dB per octave for frequencies in the region of the fundamental and second harmonic of an electrical signal representing the data bit string 110110.

20. Apparatus for correcting for outward peak shift between two successive pulses in an electrical signal representing a serial data stream, said apparatus comprising:
 (a) an input;
 (b) an output; and
 (c) equalizing filter means, connected between said input and said output, for modifying said electrical signal and having a response, in the frequency domain, determined by the Laplace transform:

$$F(s) = \frac{1 + T_1 T_2 s^2}{T_2 s + 1}$$

where
s is the complex frequency $\sigma + j\omega$, $T_1$ is a time constant which creates a high frequency pole on the complex s plane, and $T_2$ is a time constant which creates a low frequency zero on the complex s plane.

21. The apparatus recited in claim 20, where $T_1$ and $T_2$ are symmetrical about a point of interest.

22. The apparatus recited in claim 20, wherein the low frequency zero is at a frequency below the fundamental of the said electrical signal, when said electrical signal represents the data bit string 110110.

23. The apparatus recited in claim 22, wherein the high frequency pole is at a frequency above the second harmonic of said electrical signal.

24. The apparatus recited in claim 20, further comprising low-pass Gaussian filter means for modifying said electrical signal.

25. The apparatus recited in claim 20, further comprising by-pass switch means for selectively disconnecting said equalizing filter means from the signal path when the signal modification is not desired.

26. The apparatus recited in claim 20, further comprising amplifier means, connected between said input and said filter means, said amplifier means comprising a differential amplifier having a differential input and a differential output.

27. The apparatus recited in claim 26, wherein said equalizing filter means comprises two identical filter devices, each connected to one terminal of said differential output.

28. The apparatus recited in claim 27, wherein said filter devices have a common, floating ground.

29. The apparatus recited in claim 20, wherein said euqalizing filter means provides a substantially linear time delay and a gain rise in the range of 4–8 dB per octave for frequencies in the region of the fundamental and second harmonic of an electrical signal representing the data bit string 110110.

30. The apparatus recited in claim 29, wherein said gain rise is substantially equal to 6 dB.

31. The apparatus recited in claim 20, wherein said equalizing filter means comprises, in combination:
 (a) an operational amplifier having a positive and a negative input and an output;
 (b) a first resistor coupling the input of said equalizing filter means with said positive input of said operational amplifier;
 (c) a first capacitor coupling the ground of said equalizing filter means with said positive input of said operational amplifier;
 (d) a second capacitor coupling said input of said equalizing filter means with said negative input of said operational amplifier; and
 (e) a second resistor coupling said output of said operational amplifier with said negative input thereof.

32. The apparatus recited in claim 31, wherein said equalizing filter means further comprises a stabilizing capacitor connected in parallel with said second resistor.

33. The apparatus recited in claim 31, wherein said operational amplifier includes two additional inputs, one of said additional inputs being connected to a DC voltage source, and wherein said equalizing filter further comprises a stabilizing capacitor connected between two additional inputs.

34. The apparatus recited in claim 31, wherein said equalizing filter means further comprises a stabilizing resistor connected in series with said second capacitor.

* * * * *